C. F. GREEN.
WIND SHIELD.
APPLICATION FILED AUG. 6, 1913.
1,119,505.
Patented Dec. 1, 1914
2 SHEETS—SHEET 2.
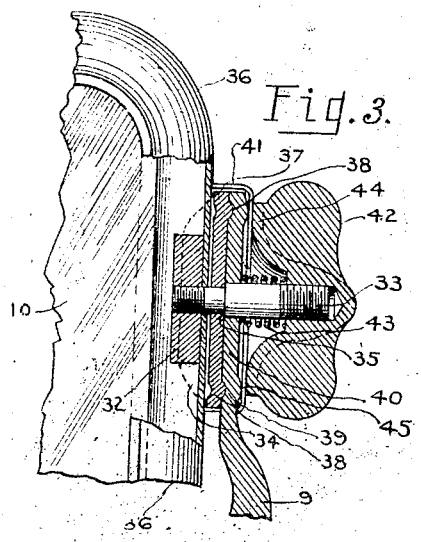
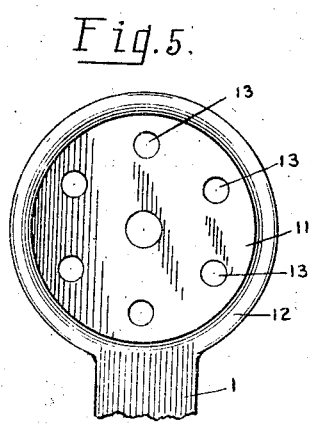
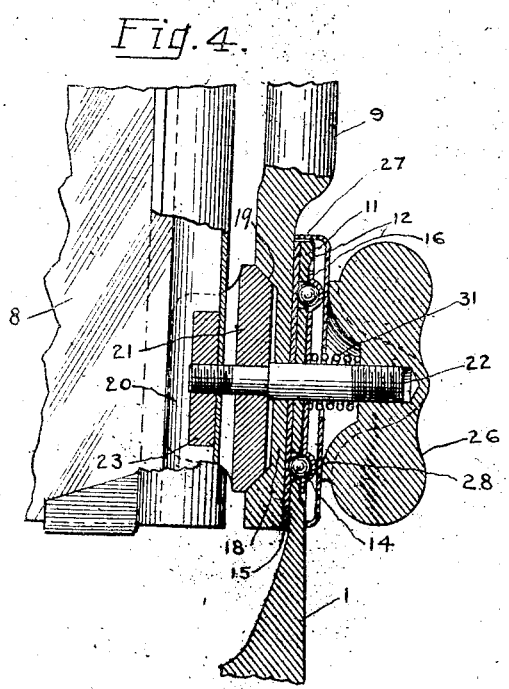
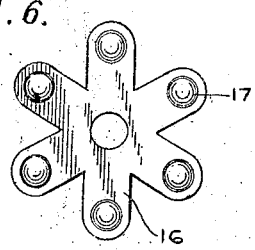
WITNESSES:
D. C. Walter
R. G. Allen
INVENTOR
Charles F. Green
By Owen & Owen
His attys

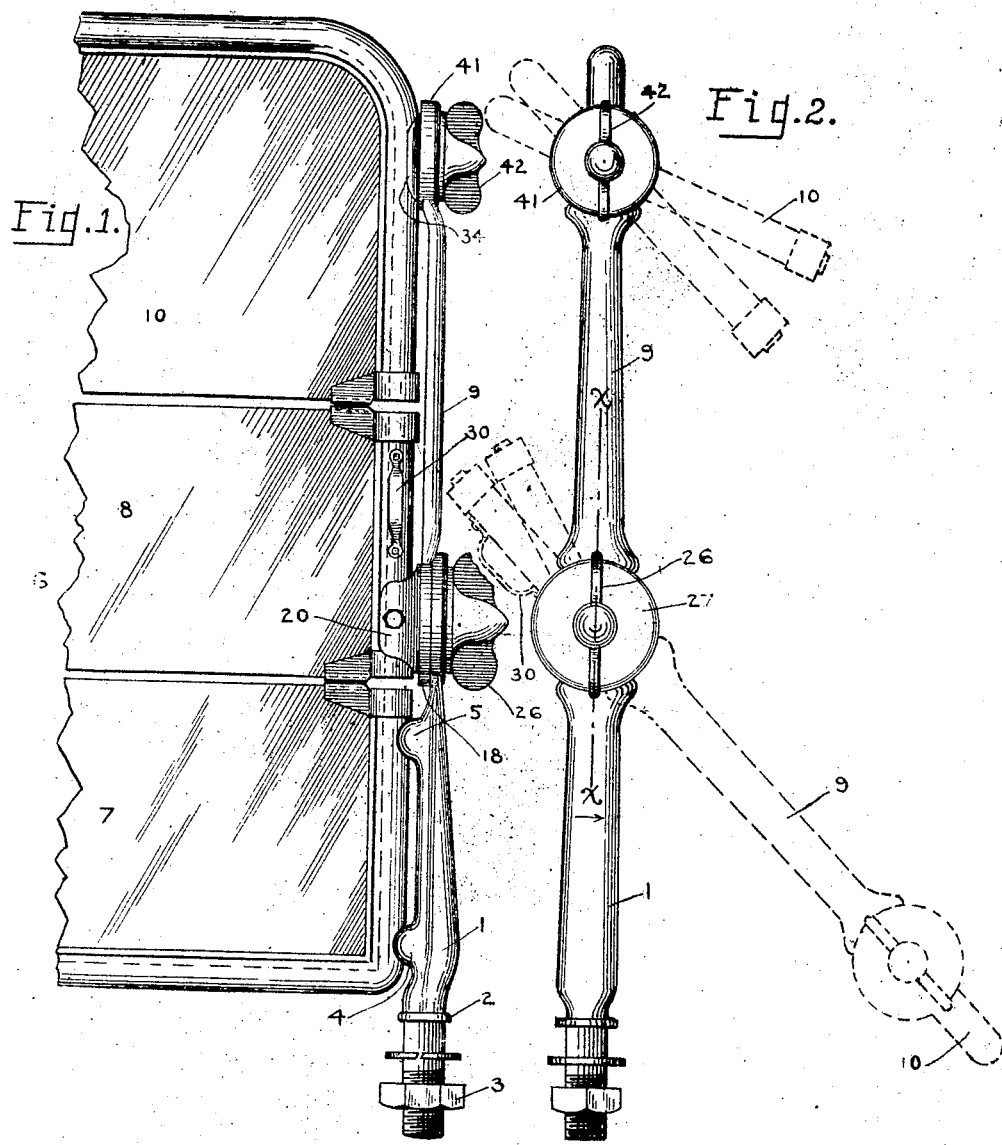

UNITED STATES PATENT OFFICE.

CHARLES F. GREEN, OF TOLEDO, OHIO, ASSIGNOR, BY MESNE ASSIGNMENTS, TO THE WILLYS-OVERLAND COMPANY, OF TOLEDO, OHIO, A CORPORATION OF OHIO.

WIND-SHIELD.

1,119,505. Specification of Letters Patent. Patented Dec. 1, 1914.

Application filed August 6, 1913. Serial No. 783,326.

*To all whom it may concern:*

Be it known that I, CHARLES F. GREEN, a citizen of the United States, and a resident of Toledo, in the county of Lucas and State of Ohio, have invented a certain new and useful Wind-Shield; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to wind shields, and it has for its object the provision of an adjustable rain vision in connection with such shields. To accomplish this the shield is divided into sections and means is provided which will permit the upper and the adjoining sections to be turned at any desired angle about horizontal axes and to permit, if desired, the upper section to be carried outward to further protect the rain vision.

The invention also has for its object the provision of means for locking the sections in position which may be easily manipulated and which will permit the relation of the sections to be easily modified.

For the purpose of illustration and to clearly describe an operable construction containing my invention I have selected the particular wind shield shown in the drawings, it being understood that my invention may be embodied in a variety of forms of wind shields, and such forms may still contain my invention.

In Figure 1 of the drawings is shown an elevational view of one half of the wind shield construction. In Fig. 2 is illustrated a side view of the construction. In Fig. 3 is shown a sectional view of the disk hinge for adjustably securing the upper section of the wind shield. In Fig. 4 is shown a sectional view of the disk hinge for adjustably securing the supporting side arm and a lower section of the wind shield. Fig. 5 illustrates the supporting hinge disk, and Fig. 6 illustrates a spring used in connection with the hinge shown in Fig. 4.

1 is a support, which is secured to the vehicle by means of a flange 2 and the nut 3. It may be provided with lugs 4 and 5 for overlapping and securing the side edges of a section 7 of the wind shield 6. The upper end of the support 1 is provided with a disk hinge 11, which is adapted to adjustably secure an intermediate section 8 of the wind shield 6 and a side arm 9. The side arm 9 is provided with a disk hinge 40, which adjustably secures the upper section 10 of the wind shield 6.

The hinge-disk 11, shown in Fig. 5, is provided with a rim 12 and holes 13. Balls 14 are located in the holes 13. They ride on the hardened steel disk 15 when the arm 9 is rotated with respect to the support 11. A spring 16 having a plurality of arms and niches 17, in which the balls 14 are located, elastically presses the balls against the hardened plate 15. The lower end of the side arm 9 is also provided with a hinge disk 18. The disk 18 has a frustumal recess 19. A pipe plate 20 is secured to the side edge of the intermediate section 8 and is provided with a frustumal shaped disk 21, which registers with the recess 19, and frictionally engages the hinge disk 18. A bolt 22 passes through the side edge of the intermediate section and is screwed into the pipe nut or plug 23. The bolt 22 is provided with a shoulder, which is adapted to set against the disk 21. The bolt 22 is thus secured in position on the side edge of the intermediate section 8. The bolt 22 passes through the lower arm hinge disk 18, the hardened disk 15, the support hinge disk 11 and the spring 16. A cap 27 covers the spring 16, the disks 11 and 15. A winged cap nut 26 is located on the outer end of the bolt 22. The hinge cap nut is provided with a flaring edge 28, which presses against the cap 27 and tightly holds the balls 14 between the plate 15 and the spring 16. The balls 14 being located in holes 13 in the disk 11 causes engagement between the disk 11 and the disk 15. When the angular relation between the side arm and the supporting arm is to be changed the wing cap nut 26 may be loosened and the side arm may be turned. This carries with it the intermediate section 8. A spring 31 presses the center of the spring 16 and keeps the balls 14 in position when the wing cap 26 is unscrewed and at the same time causes a continuous frictional engagement between the disks 21 and the disk 18. If the intermediate section is to be changed with respect to the side arm 9 it may be altered by taking hold of the handle 30 and the arm 9 and pulling them apart or pushing them together angularly.

The section 10 is provided with a pipe nut or plug 32 to which is secured the bolt 33. A pipe plate 34 is located at the upper part of the side of the section 10 and between a shoulder 35 located on the bolt and the rim or edge 36 of the section. A hinge disk 37 forms a part of the plate 34. It is provided with a plurality of bosses 38. Corresponding bosses 39 are formed in the upper side arm hinge disk 40. The bosses 38 set into the bosses 39. A cap 41 covers the hinge disks. A winged cap nut 42 is located on the outer end of the bolt 33. A spring 43 is located between the cap nut and hinge disk 40. The cap nut 42 is provided with a flaring edge 44, which presses against the cap 41, and the rim 45 and the boss 38 which sets into the bosses 39 in the hinge disk 40 located on the upper end of the arm 9. The parts may be tightly secured together by turning the cap nut 42 on the bolt 33.

When it is desired to change the angular relation between the upper section 10 and the side arm 9 it is accomplished by unscrewing the cap nut. The section 10 is then free to move with respect to the arm 9. It may then be turned to any desired position and secured in that position by screwing down the cap nut 42.

The rain vision may be modified by changing the angular relation between the section 8 and the support 1 and by changing the angular relation between the arm 9 and the section 10. The height of the upper edge of this rain vision may be also modified by changing the angular relation of the arm 9 to the support 1. This may be accomplished by swinging the arm 9 away from the beholder. This operates to lower the upper edge of the rain vision but at the same time it operates to protect the rain vision from the rain. The rain vision may also be widened by angular movement of the intermediate section 8 toward the beholder. This lowers the lower edge of the rain vision and at the same time gives further protection from the rain.

It is evident that the intermediate section 8 is capable of having pivotal or angular adjustment relative to both the lower and upper sections, and that the upper section is capable of both pivotal and orbital adjustment relative to the adjacent sections, the pivotal adjustment thereof being about the bolts 33 as an axis and the orbital adjustment thereof being about the bolts 22 as an axis, such latter adjustment being accomplished by a forward swinging of the arms 9, which movement of the arms may place the upper section in unobstructing position either at the rear or in advance of the lower section. It is also evident that the sections 8 and 10 may be held in any desired position of adjustment with respect to the supports 1, 1, and that if desired the intermediate section may be swung on its pivot to place the major portion of the same to the rear or in advance of the lower section 7.

What I claim as new, and desire to secure by Letters Patent, is as follows:

1. In combination, a support, arms rising from said support for vertical swinging adjustment relative thereto, a windshield section adjustably hinged to the upper ends of said arms, and a second windshield section adjustably hinged near its lower edge adjacent to the swinging axis of said arms and being capable of standing with its upper edge a considerable distance above the swinging axis of said arms when the arms are swung to lowered position.

2. In combination, a support, arms pivotally rising from said support and capable of swinging movements in parallel planes relative to said support, a hinged windshield section immediately above said support with its hinge disposed adjacent to its lower edge and common to the pivots of said arms, an upper section hinged adjacent to its upper edge to the upper ends of said arms, means for securing both said arms and said lower section in adjusted relation to each other and to said support, and means for securing said upper section in adjusted relation to said arms.

3. In combination a plurality of relatively adjustable windshield sections, a subjacent support, side arms, one of said sections and the lower ends of said side arms having common hinge connection to said support with the axis of said section disposed adjacent to its lower edge, means operable to secure both said section and said arms in relative adjustment, and means pivotally connecting the upper ends of said arms to the ends of another of said sections adjacent to its upper edge and operable to secure the section and arms in adjusted relation.

4. A windshield having an intermediate section and a section above and a section below said intermediate section, means supporting the intermediate section at its lower edge for angular adjustment, said means also serving as a support for the lower section, and means supporting the upper section adjacent to its upper edge for orbital adjustment relative to the subjacent sections with the axis of such adjustment common to the axis of adjustment of the intermediate section.

In testimony whereof, I have hereunto signed my name to this specification in the presence of two subscribing witnesses.

CHARLES F. GREEN.

Witnesses:
F. E. AUL,
F. F. CRAMPTON.